United States Patent Office 3,029,216
Patented Apr. 10, 1962

3,029,216
BLOCK COPOLYMER OF DISSIMILAR 1,2-ALKYL-ENE OXIDES AND PROCESS FOR PREPARING THE SAME
Frederick E. Bailey, Jr., Charleston, and Haywood G. France, South Charleston, W. Va., assignors to Union Carbide Corporation, a corporation of New York
No Drawing. Filed Aug. 11, 1958, Ser. No. 754,146
17 Claims. (Cl. 260—42)

This invention relates to the process for preparing block copolymers. In one aspect this invention relates to the products resulting from the above-said process.

In the past few years increasing attention has been observed in the field of synthesizing block copolymers. This noted activity has been stimulated, in part, by the potential economic value of some of the novel block copolymers recently prepared. The term "block copolymer" has been used to describe linear molecules which are composed of a block or section of one polymer linearly attached to the block or section of a different polymer. The block copolymer molecule also can be composed of alternating blocks or sections of different polymers which are chemically united to each other to form a linear molecule. For example; if the monomers are depicted by the letters D and E, an illustrated block copolymer is as follows:

----DDDDDEEEEEEDDDD----

By way of further example, if the monomers are depicted by letter F, G, and H, an illustrated block copolymer can be represented as follows:

----FFFFFFGGGGGHHHHHHH----

The present invention is directed to block copolymers, the molecules of which contain at least one polymer section or polymer block of a 1,2-alkylene oxide and at least one polymer section or polymer block of a dissimilar 1,2-alkylene oxide, the above-said polymer sections or polymer blocks being chemically united to form essentially linear molecules. The block copolymers are further characterized in that the polymer section(s) or polymer block(s) prepared from a common 1,2-alkylene oxide monomer comprise at least 5 weight percent of the block copolymer. It is observed via reduced viscosity measurements that the average molecular weight of the solid block copolymers prepared according to the teachings hereinafter set forth is above about 25,000.

The broad aspect of the present invention is directed to the preparation of the solid block copolymers characterized by the following formula:

(I) 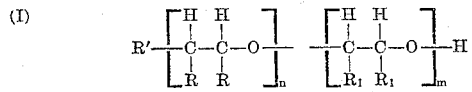

wherein each R and $R_1$, individually, can be hydrogen or a hydrocarbon radical free from ethylenic and acetylenic unsaturation, e.g. alkyl, aryl, cycloalkyl, aralkyl, and alkaryl, except that at least one $R_1$ variable is always a hydrocarbon radical. In addition, both R variables can be alkylene radicals which together with the vicinal carbon atoms of the oxyethylene group, i.e.

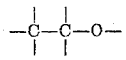

form a saturated cycloaliphatic hydrocarbon nucleus containing from 4 to 10 carbon atoms, preferably from 4 to 8 carbon atoms, for example, cycloalkyl, alkyl-substituted cycloalkyl, cyclobutyl, cyclopentyl, cyclohexyl, cycloheptyl, cyclooctyl, 2-methylcyclopentyl, 3-amylcyclohexyl, 2,4-dipropylcycloheptyl, and the like. Formula I is further characterized in that $n$ and $m$ are numbers, the ratio of $n/m$ being a value in the range of from about 0.05 to about 20; and R' is a monovalent organic residue of the organometallic catalyst employed, i.e., alkoxy, aryloxy, or hydrocarbon radical, e.g. alkyl, cycloalkyl, aryl, alkaryl, or aralkyl. Specific examples of the monovalent organic residue is depicted by the variable R' in Formula III below. The molecular weight of the resinous block copolymer is at least about 25,000 and upwards to several hundred thousand, and higher, e.g. from above about 25,000 to 500,000, and higher.

With reference to Formula I supra, each R and $R_1$, individually, also can be illustrated, for example, by radicals such as methyl, ethyl, propyl, butyl, isobutyl, hexyl, isohexyl, 2-ethylhexyl, octyl, decyl, dodecyl, phenyl, benzyl, tolyl, phenethyl, phenylpropyl, cyclopentyl, cyclohexyl, 2-methylcyclohexyl, cycloheptyl, and the like. It is preferred that each bracketed oxyalkylene unit as shown in Formula I supra contains less than 13 carbon atoms. The number of successive oxyalkylene units comprising the polymer block or polymer section of the block copolymer molecule will depend on several factors discussed hereinafter. As indicated previously, the novel solid block copolymers prepared in accordance with the process of this invention have molecular weights at least about 25,000. Thus, since $n/m$ (ratio of subscripts $n$ and $m$ of Formula I supra) is in the range of from about 0.05 to 20, the molecular weights assignable to each polymer section or polymer block of the block copolymer is apparent. It should be noted that the block copolymers of this invention can comprise alternating polymer blocks or polymer sections.

One aspect of the present invention relates to the preparation of resinous block copolymers characterized by the following formula:

(II)   R'(oxyalkylene A)$_n$(oxyalkylene B)$_m$H wherein oxyalkylene A and oxyalkylene B represent dissimilar oxyalkylenes formed from the ring opening of the epoxy group, i.e.,

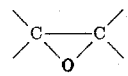

of their corresponding 1,2-alkylene oxides. For example, if oxyalkylene A is

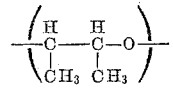

then the corresponding 1,2-alkylene oxide (prior to the ring opening of the epoxy group which occurs during the polymerization of the 1,2-alkylene oxide) would be

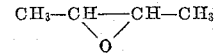

i.e., 2,3-epoxybutane. With reference to Formula II, the variables R', $m$, and $n$ have the same meanings as the corresponding variables in Formula I supra.

It is pointed out at this time by the term "1,2-alkylene oxide," as used herein including the appended claims, is meant an organic compound which contains solely carbon, hydrogen, and oxirane oxygen, said oxirane oxygen being bonded to vicinal or adjacent carbon atoms to form the following epoxy group, i.e.

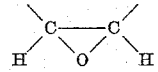

and wherein each unsatisfied epoxy carbon valence of said group is satisfied by hydrogen or a hydrocarbon radical free from ethylenic and acetylenic unsaturation such as alkyl, cycloalkyl, aryl, aralkyl, or alkaryl. In addition, these unsatisfied epoxy carbon valences can be satisfied by alkylene radicals which together with the epoxy carbon atoms form a saturated cycloaliphatic hydrocarbon nucleus containing from 4 to 10 carbon atoms, preferably from 4 to 8 carbon atoms.

Succinctly, the block copolymers characterized by Formulas I and II supra can be prepared by contacting monomeric 1,2-alkylene oxide (hereinafter designated, for convenience, as alkylene oxide A) with the novel organometallic catalyst to be described hereinafter, under an inert atmosphere, and preferably for a period of time until substantial homopolymerization of alkylene oxide A occurs. Subsequently, to the resulting product mixture maintained under an inert atmosphere there is charged a dissimilar monomeric 1,2-alkylene oxide (hereinafter designated as alkylene oxide B) and the polymerization reaction is preferably continued until alkylene oxide B has been substantially homopolymerized as a polymer block or polymer section of the resulting block copolymer. Thus, the resulting block copolymer comprises predominantly a block or section of homopolymerized alkylene oxide A chemically united in linear fashion to a block or section of homopolymerized alkylene oxide B. After these sequence of steps, if desired, monomeric alkylene oxide A can be again charged to the product mixture (still maintained under an inert atmosphere) or a third monomer 1,2-alkylene oxide (hereinafter designated as alkylene oxide C) can be charged to product mixture, and the polymerization reaction is preferably continued until this alkylene oxide monomer has been substantially homopolymerized as another polymer block or polymer section of the resulting block copolymer.

The organometallic catalysts which can be employed in the polymerization reaction have the following formula:

(III) $\quad R'MR''_a$ wherein M is a group II or III metal, for example, magnesium, beryllium, zinc, calcium, strontium, barium, cadmium, aluminum, indium, gallium, and the like; wherein $a$ is an integer greater than zero and less than 3 and depends for its value upon the valence of the metal (M); wherein R' is an alkoxy, aryloxy, or hydrocarbon radical free from ethylenic and acetylenic unsaturation, e.g. alkyl, aryl, cycloalkyl, alkaryl, or aralkyl; and wherein R'' (or each R'', individually, when M has a valence of 3) is a halogen, e.g., chlorine, iodine, fluorine, bromine; aryloxy; alkoxy; or a hydrocarbon radical free from ethylenic and acetylenic unsaturation, e.g., alkyl, aryl, cycloalkyl, aralkyl, or alkaryl. Illustrative R' and R'' radicals include, among others, methoxy, propoxy, butoxy, hexoxy, 2-methyloctoxy, 2,4-diethyldodecoxy, phenoxy, 2-butylphenoxy, propoxyphenyl, methyl, butyl, 2-ethylhexyl, 2,2,4-trimethyloctyl, dodecyl octadecyl, phenyl, tolyl, xylyl, phenethyl, phenylpropyl, phenylbutyl, benzyl, cyclopentyl, cyclohexyl, 3-propylcyclohexyl, cycloheptyl, alkyl-substituted cycloalkyl, and the like. It is preferred that each R' and R'' contain less than 12 carbon atoms.

Illustrative classes of organometallic catalyst which can be employed in the instant invention include, for example, dialkylzinc, alkylzinc halide, dialkoxyzinc, alkoxyalkylzinc, trialkylaluminum, alkylaluminum dihalide, trialkoxyaluminum, diaryloxyaluminum halide, dialkylalkoxyaluminum, dialkylaluminum halide, dialkylmagnesium, alkylarylmagnesium, alkylmagnesium halide, alkylberyllium halide, alkylcycloalkylberyllium, dialkylcadmium, diarylindium halide, trialkylindium, triakylgallium, alkylarylindium halide, and the like. Specific examples of the organometallic catalysts include, among others, dibutylzinc, butylzinc chloride, dipropoxyzinc, butoxyoctylzinc, triisobutylaluminum, trioctadecylaluminum, hexylaluminum dibromide, diethylaluminum chloride, trioctoxyaluminum, diphenoxyaluminum bromide, dipropylmethoxyaluminum, dibutylmagnesium, propylphenylmagnesium, ethylmagnesium iodide, ethylberyllium chloride, butylcyclohexylberyllium, diisopropylcadmium, diphenylindium iodide, triisobutylindium, diethylpropylgallium, trimethylgallium, and the like.

Accordingly, one or more of the following objects will be achieved by the practice of this invention.

It is an object of this invention to prepare novel resinous block copolymers which contain at least one polymer section or polymer block of a 1,2-alkylene oxide and at least one polymer section or polymer block of a dissimilar 1,2-alkylene oxide, the above-said polymer sections or polymer blocks being chemically united to form essentially linear molecules. It is another object of this invention to prepare novel block copolymers by a polymerization process which is conducted in the presence of a catalytic quantity of an organometallic catalyst previously described. A further object of this invention is to provide novel solid block copolymers, the properties and characteristics of which can be "tailor-made" to fit a wide variety of uses and fields of application. Other objects will become apparent to those skilled in the art in the light of the instant specification.

Before proceeding further with the discussion regarding the preparation of the novel block copolymers of this invention, it is deemed appropriate to define the term "reduced viscosity." Unless otherwise stated, by the term "reduced viscosity" as used in this specification including the appended claims, is meant a value obtained by dividing the specific viscosity by the concentration of the block copolymer in solution, the concentration being measured in grams of copolymer per 100 milliliters of solvent at a given temperature, and is regarded as a measure of molecular weight. The specific viscosity is obtained by dividing the difference between the viscosity of the solution and the viscosity of solvent by the viscosity of the solvent. The "reduced viscosity" values herein referred to were measured at a concentration of 0.2 gram of block copolymer in 100 milliliters of an inert organic diluent therefor, e.g., acetonitrile, benzene, and the like at 30° C. It has been observed that the novel resinous block copolymers possess a reduced viscosity in acetonitrile or benzene of at least about 0.2 to 0.3. In general, the greater the reduced viscosity value, in a common diluent, the greater the molecular weight of the block copolymer.

The monomeric 1,2-alkylene oxides employed in the novel polymerization process of this invention are characterized by the following formula:

(IV) 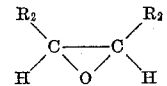

wherein each $R_2$, individually, can be hydrogen or a hydrocarbon radical free from ethylenic and acetylenic unsaturation such as, for example, alkyl, aryl, cycloalkyl, aralkyl, or alkaryl radicals. In addition, both $R_2$ variables can be alkylene radicals which together with the epoxy carbon atoms, i.e., the carbon atoms of the epoxy group

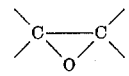

for a saturated cycloaliphatic hydrocarbon nucleus containing from 4 to 10 carbon atoms, preferably from 4 to 8 carbon atoms, for example, cycloalkyl, alkyl-substituted cycloalkyl, cyclobutyl, cyclopentyl, cyclohexyl, cycloheptyl, cyclooctyl, 2-methylcyclopentyl, 3-amylcyclohexyl, and the like. Illustrative $R_2$ radicals include, among others, methyl, ethyl, propyl, butyl, isobutyl, hexyl, isohexyl, 3-propylheptyl, dodecyl, octadecyl, phenyl, benzyl, tolyl, phenethyl, phenylpropyl, cyclopentyl, cyclohexyl, 2-methylcyclohexyl, cycloheptyl, and the like. In a preferred aspect the monomeric 1,2-alkylene oxide is a lower 1,2-alkylene oxide, that is, each $R_2$ variable can be hydrogen or lower alkyl, e.g., methyl, ethyl, propyl, isopropyl, n-butyl, isobutyl, and the like.

Illustrative 1,2-alkylene oxide monomers which can be employed in the preparation of the block copolymers include, for example, ethylene oxide, propylene oxide, 1,2-butylene oxide, 2,3-butylene oxide, diisobutylene oxide, the epoxypentanes, the epoxyhexanes, 2,3-epoxy-4,5-dimethylheptane, 1,2-epoxy-3,4,4-trimethylpentane, nonene oxide 1,2-epoxy-3-butyl-4-propyloctane, 1,2-epoxy-3-phenylbutane, 2,3-epoxy-5-benzylheptane, 2,3-epoxy-4-cyclohexylpentane, styrene oxide, ortho-, meta-, and para-ethylstyrene oxide, glycidyl benzene, the oxabicycloalkanes, e.g., 7-oxabicyclo[4.1.0]heptane, 6-oxabicyclo[3.1.0]hexane, 4-propyl-7-oxabicyclo[4.1.0]heptane, 3-amyl-6-oxabicyclo[3.1.0]hexane; alkyl-substituted oxabicycloalkanes; aryl-substituted alkylene oxides; and the like.

The actual mechanism by which the block copolymers are formed during the polymerization reaction is not understood at this time. However, it is believed that during the homopolymerization, under an inert atmosphere, of the first 1,2-alkylene oxide, for example

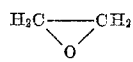

in the presence of the organometallic catalyst, i.e., $R'MR_a''$ the following product is obtained:

(V) 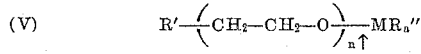

The site designated by the vertical arrow in Formula V is believed to be an active site, and consequently, upon charging the second dissimilar 1,2-alkylene oxide, for example

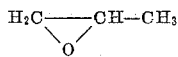

to the reaction mixture (under an inert atmosphere), the following resinous block copolymer product is subsequently formed:

(VI) 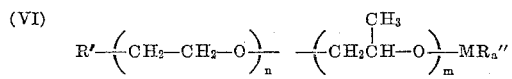

The variables R', R'', M, a, n, and m have the same meanings as the corresponding variables in Formulas I and III supra. Upon exposing the reaction mixture comprising block copolymer product, for example, to air, the catalyst becomes deactivated and further polymerization onto the existing block copolymer does not occur. Unreacted 1,2-alkylene oxides can be recovered from the reaction product by conventional techniques such as distillation, fractionation, and the like. If desired, the block copolymer product can be substantially freed from catalyst residues, for example, by dissolving the reaction product in water, removing the resulting metal hydroxide precipitate by filtration, and subsequently evaporating the solution. However, when the block copolymer is water-insoluble, it can be freed from catalyst residues by extraction with dilute mineral acid or organic acid, e.g. acetic acid. Alternatively, the reaction product comprising water-insoluble block copolymer can be dissolved in an organic solvent, the resulting solution then can be extracted with water, and the metal hydroxide removed by filtration. Another route involves dissolution in a first organic solvent, followed by addition of a second organic solvent which is miscible with the first solvent but which is a non-solvent for the block copolymer, thus resulting in precipitating the block copolymer product.

With reference to the block copolymer characterized by Formula VI supra, exposure of the reaction product to traces of moisture in the atmosphere, or by treating, washing, and/or extracting the reaction product comprising block copolymer with water, mineral acid, organic acid, saturated aliphatic alcohol, e.g., methanol, ethanol, propanol, and the like, such as illustrated previously, or a compound containing active hydrogen which is non- reactive with the block copolymer chain, the $-MR_a''$ portion of the block copolymer molecule is replaced with hydrogen. The resulting product for purposes of this illustration is thus characterized as follows:

(VII) 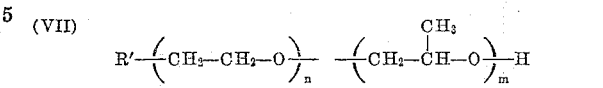

The organometallic catalyst is employed in catalytic quantities, and, in general, a catalyst concentration in the range of from about 0.01 to about 15 weight percent and higher, based on the total weight of monomeric alkylene oxide feed, is suitable. A catalyst concentration range of from about 0.1 to 2.0 is preferred.

The polymerization reaction can be conducted at a temperature in the range of from about 20° C. to about 150° C., and preferably from about 75° C. to about 110° C. As a practical matter, the choice of the particular temperature at which to effect the polymerization reaction depends, to an extent, on the nature of the 1,2-alkylene oxide reagents, the particular catalyst employed, and the like.

In general, the reaction time will vary depending on the operative temperature, the nature of the 1,2-alkylene oxide reagents and catalyst employed, the concentration of the catalyst, the use of an inert organic diluent, and other factors. The reaction time can be as short as a few hours in duration or it can be as long as several days. A practical and suitable total reaction period is from about 5 hours, and lower, to about one week, and longer, and preferably from about 5 hours to about 48 hours.

The polymerization reaction takes place in the liquid phase and a pressure above atmospheric is generally employed to maintain the liquid phase. However, in the usual case, external pressure is unnecessary, and it is only necessary to employ a reaction vessel capable of withstanding the autogenous pressure of the reaction mixture.

The copolymers of this invention can be prepared via the bulk polymerization, suspension polymerization, or the solution polymerization routes. The solution polymerization route is preferred. The polymerization reaction can be carried out in the presence of an inert organic diluent such as, for example, aromatic hydrocarbons, e.g. benzene, chlorobenzene, toluene, xylene, and the like; various oxygenated organic compounds such as dimethyl and diethyl ethers of ethylene glycol, propylene glycol, diethylene glycol, anisole, and the like; normally liquid saturated hydrocarbons, e.g., pentane, hexane, heptane; cycloalkanes, e.g. cyclopentane, cyclohexane, and the like.

A suitable procedure for preparing the novel block copolymers of this invention is as follows: To a stainless steel autoclave, after flushing with an inert gas such as, for example, nitrogen, argon, or the 1,2-alkylene oxide monomer, if volatile, there is charged the first 1,2-alkylene oxide A monomer, catalyst, and inert organic diluent, e.g. toluene, if desired. The reaction mixture is then heated to the desired temperature, preferably from about 75° C. to 110° C., and preferably maintained thereat until the homopolymerization is substantially complete, e.g., until at least 75 percent and preferably at least 90 percent, or higher, of 1,2-alkylene oxide A has been homopolymerized. The degree of homopolymerization of alkylene oxide A is readily determined by the operator who can intermittently remove a sample of the reaction mixture and analyze same for the unreacted epoxide reagent. The weight percent of the original alkylene oxide A feed, based on the total weight of the reaction mixture originally charged to the autoclave is apparent from knowledge of the weight of each initial component comprising the original charge. By determining the weight percent value of unreacted 1,2-alkylene oxide A in a reaction mixture sample, the degree of polymerization is evident by simple arithmetic calculation.

When substantial homopolymerization has occurred, the autoclave is preferably cooled to room temperature, e.g., 20° C. to 25° C., and while the reaction mixture is still maintained under an inert gas, a second dissimilar 1,2-alkylene oxide B is then charged to the sealed autoclave. The resulting reaction mixture is again heated to the desired operative temperature and preferably maintained thereat until 1,2-alkylene oxide B has been substantially homopolymerized as a polymer block or polymer section of the resulting block copolymer product. Periodic sampling of the reaction mixture by the operator can be conducted as before to ascertain the degree of polymerization of 1,2-alkylene oxide B. If desired, a third alkylene oxide C monomer, or the first alkylene oxide A monomer, can be homopolymerized as a polymer block or polymer section of the resulting block copolymer by repeating the sequence of steps described previously. The reaction mixture comprising the block copolymer product then can be slurried with a saturated aliphatic hydrocarbon, e.g., heptane, from which the resulting block copolymer precipitate can be recovered. If desired, the block copolymer resin can be washed with water or a saturated aliphatic alcohol, e.g. methanol, followed by drying the resinous product under reduced pressure and preferably at slightly elevated temperatures, e.g. about 40° C. The resulting block copolymer product recovered in the manner described above is characterized as shown in Formula I supra.

The instant invention is admirably suitable for preparing novel block copolymers which properties and characteristics can be "tailor-made" to fit various fields of application. For example, resinous poly(ethylene oxide) is water-soluble; however, by introducing a polymer block or polymer section of poly(propylene oxide) to the poly(ethylene oxide) molecule in accordance with the teachings hereinbefore described the physical character of resinous poly(ethylene oxide) can be converted from hydrophilic to hydrophobic depending on the weight percent of poly(propylene oxide) added as a polymer block. Conversely, the water-insolubility characteristic of resinous poly(propylene oxide) can be altered by introducing a polymer block or polymer section of water-soluble poly(ethylene oxide) into the poly(propylene oxide) molecule. Other properties such as the degree of stiffness, flexibility, tensile strength, hardness, etc. which may be desired in the novel block copolymers for a particular field of application can be obtained by controlling the degree of homopolymerization of the 1,2-alkylene oxides which are to form the polymer block or polymer section of the resulting block copolymers. In brief, novel block copolymers covering a wide spectrum of properties and characteristics are obtainable by the practice of the instant invention. The novel resinous block copolymers are useful in the preparation of shaped articles by employing molding and extruding techniques. The block copolymers are also useful in the preparation of films by conventional techniques such as milling on a two roll mill, calendering, solvent casting, and the like. Water-soluble films can be used for unit packaging of a wide variety of water-soluble chemicals such as household detergents. Water-insoluble films, on the other hand, are useful in protecting various apparata such as machinery from exposure to moisture and dampness. The water-soluble block copolymers also have utility as coagulants and thickeners.

In illustrative Examples 1–16 to follow, the steel autoclave was first flushed with nitrogen prior to the initial charging of the reaction components. The polymerization was conducted under this inert atmosphere. Air also was exluded during the charging of the subsequent monomeric 1,2-alkylene oxide. In all the examples a mixture of isomers containing about 70 weight percent 1,2-epoxybutane and about 30 weight percent of the cis and trans 2,3-epoxybutane was employed wherever the 1,2-alkyene oxide was designated as butylene oxides.

*Example 1*

To a two-liter, stainless steel autoclave there was charged 90 grams of propylene oxide, 298 grams of toluene, and 1.84 grams of dibutylzinc. The resulting mixture was then heated to 110° C. and maintained thereat for 26 hours after which period of time substantial homopolymerization of propylene oxide occurred. The autoclave was subsequently cooled to room temperature, i.e., about 20° C. to 25° C., and 210 grams of ethylene oxide was charged to said autoclave. The temperature of the resulting mixture was again raised to 110° C. and maintained thereat for 21.5 hours after which period of time substantial homopolymerization of ethylene oxide occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 170 grams of a white, resinous, water-soluble block copolymer which had a reduced viscosity in benzene of 0.5.

*Example 2*

To the equipment described in Example 1 there was charged 149 grams of ethylene oxide, 289 grams of toluene, and 1.84 grams of dibutylzinc. The resulting mixture was then heated to 110° C. and maintained thereat for 23 hours after which period of time substantial homopolymerization of ethylene oxide occurred. The autoclave was subsequently cooled to room temeprature, i.e., about 20° C. to 25° C., and 289 grams of propylene oxide was charged to said autoclave. The temperature of the resulting mixture was again raised to 110° C. and maintained thereat for 23 hours after which period of time substantial homopolymerization of proylene oxide occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 323 grams of a white, resinous, water-insoluble block copolymer which had a reduced viscosity in benzene of 2.38.

*Example 3*

To the equipment described in Example 1 there was charged 149 grams of ethylene oxide, 289 grams of toluene, and 1.84 grams of dibutylzinc. The resulting mixture was then heated to 110° C. and maintained thereat for 23 hours after which period of time substantial homopolymerization of ethylene oxide occurred. The autoclave was subsequently cooled to room temperature, i.e., about 20° C. to 25° C. and 149 grams of propylene oxide was charged to said autoclave. The temperature of the resulting mixture was again raised to 110° C. and maintained thereat for 18.5 hours after which period of time substantial homopolymerization of propylene oxide occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 128 grams of a white, resinous, water-insoluble block copolymer which had a reduced viscosity in benzene of 0.94.

*Example 4*

To the equipment described in Example 1 there was charged 149 grams of ethylene oxide, 572 grams of toluene, and 1.84 grams of dibutylzinc. The resulting mixture was then heated to 105° C. and maintained thereat for 16 hours after which period of time substantial homopolymerization of ethylene oxide occurred. The autoclave was subsequently cooled to room temperature, i.e., about 20° C. to 25° C., and 149 grams of propylene oxide was charged to said autoclave. The temperature of the resulting mixture was again raised to 105° C. and maintained thereat for 23 hours after which period of time substantial homopolymerization of propylene oxide occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 134 grams of a white, resinous, slightly water-soluble block copolymer which had a reduced viscosity in benzene of 1.36.

*Example 5*

To the equipment described in Example 1 there was charged 149 grams of ethylene oxide, 298 grams of toluene, and 1.84 grams of dibutylzinc. The resulting mixture was then heated to 105° C. and maintained thereat for 17 hours after which period of time substantial homopolymerization of ethylene oxide occurred. The autoclave was subsequently cooled to room temperature, i.e., about 20° C. to 25° C. and 149 grams of propylene oxide was charged to said conclave. The temperature of the resulting mixture was again raised to 105° C. and maintained thereat for 24 hours after which period of time substantial homopolymerization of propylene oxide occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 144 grams of a white, resinous, mostly water-soluble block copolymer which had a reduced viscosity in benzene of 1.03.

*Example 6*

To the equipment described in Example 1 there was charged 210 grams of ethylene oxide, 298 grams of toluene, and 1.84 grams of dibutyl zinc. The resulting mixture was then heated to 100° C. and maintained thereat for 23 hours after which period of time substantial homopolymerization of ethylene oxide occurred. The autoclave was subsequently cooled to room temperature, i.e. about 20° C. to 25° C. and 90 grams of propylene oxide was charged to said autoclave. The temperature of the resulting mixture was again raised to 100° C. and maintained thereat for 24.5 hours after which period of time substantial homopolymerization of propylene oxide occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 198 grams of a white, resinous, block copolymer which had a reduced viscosity in acetonitrile of 0.37.

*Example 7*

To the equipment described in Example 1 there was charged 210 grams of ethylene oxide, 298 grams of toluene, and 1.84 grams of dibutylzinc. The resulting mixture was then heated to 110° C. and maintained thereat for 23 hours after which period of time substantial homopolymerization of ethylene oxide occurred. The autoclave was subsequently cooled to room temperature, i.e., about 20° C. to 25° C., and 90 grams of propylene oxide was charged to said autoclave. The temperature of the resulting mixture was again raised to 110° C. and maintained thereat for 21 hours after which period of time substantial homopolymerization of propylene oxide occurred as a polymer block of the block copolymer product. Adidtion of heptane to the reaction mixture, with agitation, resulted in the precipitation of the block copolymer product. This product was recovered by filtration and dried under reduced pressure at about 40° C. There was obtained 278 grams of a white, resinous, slightly water-soluble block copolymer which had a reduced viscosity in benzene of 1.46.

*Example 8*

To the equipment described in Example 1 there was charged 210 grams of ethylene oxide, 298 grams of toluene, and 1.84 grams of dibutylzinc. The resulting mixture was then heated to 110° C. and maintained thereat for 46 hours after which period of time substantial homopolymerization of ethylene oxide occurred. The autoclave was subsequently cooled to room temperature, i.e., about 20° C. to 25° C., and 90 grams of propylene oxide was charged to said autoclave. The temperature of the resulting mixture was again raised to 110° C. and maintained thereat for 26 hours after which period of time substantial homopolymerization of propylene oxide occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 235 grams of a white, resinous, block copolymer which had a reduced viscosity in benzene of 0.80.

*Example 9*

To the equipment described in Example 1 there was charged 255 grams of ethylene oxide, 298 grams of toluene, and 1.84 grams of dibutylzinc. The resulting mixture was then heated to 110° C. and maintained thereat for 26.5 hours after which period of time substantial homopolymerization of ethylene oxide occurred. The autoclave was subsequently cooled to room temperature, i.e., about 20° C. to 25° C., and 45 grams of propylene oxide was charged to said autoclave. The temperature of the resulting mixture was again raised to 110° C. and maintained thereat for 43 hours after which period of time substantial homopolymerization of propylene occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 275 grams of a white, resinous, acetonitrile-soluble block copolymer which had a reduced viscosity in benzene of 1.3.

*Example 10*

To the equipment described in Example 1 there was charged 210 grams of ethylene oxide, 298 grams of toluene, and 1.84 grams of dibutylzinc. The resulting mixture was then heated to 110° C. and maintained thereat for 66.5 hours after which period of time substantial homopolymerization of ethylene oxide occurred. The autoclave was subsequently cooled to room temperature, i.e., about 20° C. to 25° C., and 90 grams of butylene oxides were charged to said autoclave. The temperature of the resulting mixture was again raised to 110° C. and maintained thereat for 24.5 hours after which period of time substantial homopolymerization of butylene oxides occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 208 grams of a white, resinous, block copolymer which had a reduced viscosity in acetonitrile of 0.57.

*Example 11*

To the equipment described in Example 1 there was charged 90 grams of ethylene oxide, 298 grams of toluene, and 1.84 grams of dibutylzinc. The resulting mixture was then heated to 104° C. and maintained thereat for 49 hours after which period of time substantial homopolymerization of ethylene oxide occurred. The autoclave was subsequently cooled to room temperature, i.e., about 20° C. to 25° C., and 90 grams of butylene oxides was charged to said autoclave. The temperature of the resulting mixture was again raised to 104° C. and maintained thereat for 46.5 hours after which period of time substantial homopolymerization of butylene oxides occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 57 grams of a white, resinous, block copolymer which had a reduced viscosity in benzene of 0.48. Analysis of the block copolymer disclosed 53.3 percent as carbon and 9.0 as hydrogen.

*Example 12*

To the equipment described in Example 1 there was charged 90 grams of ethylene oxide, 298 grams of toluene, and 2.5 grams of dibutylzinc. The resulting mixture was then heated to 105° C. and maintained thereat for 49 hours after which period of time substantial homopolymerization of ethylene oxide occurred. The autoclave was subsequently cooled to room temperature, i.e., about 20° C. to 25° C. and 90 grams of butylene oxides was charged to said autoclave. The temperature of the resulting mixture was again raised to 105° C. and maintained thereat for 42 hours after which period of time substantial homopolymerization of butylene oxides occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 92.7 grams of a white, resinous, block copolymer which had a reduced viscosity in benzene of 0.49. Analysis of the block copolymer disclosed 55.5 percent as carbon and 9.7 as hydrogen.

*Example 13*

To the equipment described in Example 1 there was charged 90 grams of ethylene oxide, 298 grams of toluene, and 2.5 grams of dibutylzinc. The resulting mixture was then heated to 105° C. and maintained thereat for 121 hours after which period of time substantial homopolymerization of ethylene oxide occurred. The autoclave was subsequently cooled to room temperature, i.e., about 20° C. to 25° C., and 90 grams of butylene oxides was charged to said autoclave. The temperature of the resulting mixture was again raised to 105° C. and maintained thereat for 41 hours after which period of time substantial homopolymerization of butylene oxides occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 84 grams of a white, resinous, block copolymer which had a reduced viscosity in benzene of 0.81. Analysis of the block copolymer disclosed 55.5 percent as carbon and 9.77 as hydrogen.

*Example 14*

To the equipment described in Example 1 there was charged 90 grams of ethylene oxide, 298 grams of toluene, and 3.5 grams of dibutylzinc. The resulting mixture was then heated to 105° C. and maintained thereat for 112 hours after which period of time substantial homopolymerization of ethylene oxide occurred. The autoclave was subsequently cooled to room temperature, i.e., about 20° C. to 25° C., and 90 grams of styrene oxide was charged to said autoclave. The temperature of the resulting mixture was again raised to 105° C. and maintained thereat for 21 hours after which period of time substantial homopolymerization of styrene oxide occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 158 grams of a white, resinous, block copolymer which had a reduced viscosity in benzene of 0.38. Analysis of the block copolymer disclosed 65.6 percent as carbon and 8.0 as hydrogen.

*Example 15*

To the equipment described in Example 1 there was charged 210 grams of ethylene oxide, 298 grams of toluene, and 3.5 grams of dibutylzinc. The resulting mixture was then heated to 105° C. and maintained thereat for 115.5 hours after which period of time substantial homopolymerization of ethylene oxide occurred. The autoclave was subsequently cooled to room temperature, i.e., about 20° C. to 25° C., and 90 grams of styrene oxide was charged to said autoclave. The temperature of the resulting mixture was again raised to 105° C. and maintained thereat for 25 hours after which period of time substantial homopolymerization of styrene oxide occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 240 grams of a white, resinous, block copolymer which had a reduced viscosity in benzene of 0.39.

*Example 16*

To the equipment described in Example 1 there was charged 90 grams of propylene oxide, 298 grams of toluene, and 3.5 grams of dibutylzinc. The resulting mixture was then heated to 108° C. and maintained thereat for 43 hours after which period of time substantial homopolymerization of propylene oxide occurred. The autoclave was subsequently cooled to room temperature, i.e., about 20° C. to 25° C., and 90 grams of butylene oxides was charged to said autoclave. The temperature of the resulting mixture was again raised to 108° C. and maintained thereat for 7 hours after which period of time substantial homopolymerization of butylene oxides occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 104 grams of a white, resinous, block copolymer which had a reduced viscosity in benzene of 1.27.

In illustrative Examples 17–22 to follow, the polymerization reactions were carried out in 50 milliliter Pyrex test tubes capable of withstanding pressures up to about 200 p.s.i.g. These Pyrex tubes were first flushed with nitrogen to exclude the presence of air throughout the course of the reaction. The first 1,2-alkylene oxide monomer, toluene, and catalyst were charged to the Pyrex test tube and said test tube was then sealed by capping. The cap (metallic) had a small hole drilled into the top and was fitted with a Teflon [1] and a rubber gasket to thus insure complete sealing. Subsequently, the test tube was inserted into an aluminum block, said aluminum block being agitated by rocking at the desired operating temperature for a given period of time. Then the test tube was cooled to room temperature, i.e., about 20° C. to 25° C., and the second 1,2-alkylene oxide monomer was added to the contents within the sealed test tube. The addition of the second 1,2-alkylene oxide was accomplished with a hypodermic syringe, the needle of which was inserted within the hole in the metallic cap and through the Teflon and rubber gaskets. Upon removal of the hypodermic needle, the gaskets self-sealed thus maintaining the inert atmosphere within the test

---

[1] E. I. du Pont de Nemours & Co. trademark for a plastic consisting of tetrafluoroethylene polymer.

tube. The tube was again heated to the desired temperature, under agitation, and maintained thereat for a given period of time. The contents within the test tube again were cooled to room temperature, the metallic cap was removed therefrom, and from 3 to 5 volumes of heptane, based on the volume of reaction product, were added thereto. The resulting block copolymer precipitate was recovered by filtration and dried under reduced pressure at slightly elevated temperature, e.g., about 40° C.

*Example 17*

To a 50 milliliter Pyrex test tube there were charged 5 grams of propylene oxide, 10 grams of toluene, and 0.5 gram of trioctadecylaluminum. The resulting mixture was then heated to 90° C. and maintained thereat for 40 hours. The test tube was subsequently cooled to room temperature, and 5 grams of styrene oxide was charged to said test tube. The temperature of the resulting mixture was raised to 90° C. and maintained thereat for 104 hours. The reaction mixture again was cooled to room temperature. Addition of heptane to the reaction mixture, with agitation, resulted in precipitation of the block copolymer product. This product was recovered by filtration and dried under reduced pressure at about 40° C. There was obtained 3.5 grams of a white, resinous product which was insoluble in water, pentane, and hexane, and soluble in toluene and xylene. The block copolymer product possessed a reduced viscosity of 0.32 in benzene.

*Example 18*

To a 50 milliliter Pyrex test tube there was charged 5 grams of propylene oxide, 10 grams of toluene, and 0.5 gram of trioctadecylaluminum. The resulting mixture was then heated to 90° C. and maintained thereat for 45 hours. The test tube was subsequently cooled to room temperature, and 5 grams of styrene oxide was charged to said test tube. The temperature of the resulting mixture was raised to 90° C. and maintained thereat for 99 hours. The reaction mixture again was cooled to room temperature. Addition of heptane to the reaction mixture, with agitation, resulted in precipitation of the block copolymer product. This product was recovered by filtration and dried under reduced pressure at about 40° C. There was obtained 4 grams of a white, resinous product which was insoluble in water, pentane, and hexane, and soluble in toluene and xylene. The block copolymer product possessed a reduced viscosity of 0.25 in benzene.

*Example 19*

To a 50 milliliter Pyrex test tube there was charged 5 grams of propylene oxide, 10 grams of toluene, and 0.5 gram of trioctadecylaluminum. The resulting mixture was heated to 90° C. and maintained thereat for 45 hours after which period of time substantial homopolymerization of propylene oxide occurred. The test tube was subsequently cooled to room temperature, and 5 grams of styrene oxide was charged to said test tube. The temperature of the resulting mixture was raised to 90° C. and maintained thereat for 99 hours after which period of time substantial homopolymerization of styrene oxide occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 7 grams of a white resinous product which was insoluble in water, pentane, and hexane, and soluble in toluene and xylene. The block copolymer product possessed a reduced viscosity of 0.26 in benzene.

*Example 20*

To a 50 milliliter Pyrex test tube there were charged 5 grams of propylene oxide, 10 grams of toluene, and 0.5 gram of diethylaluminum chloride. The resulting mixture was then heated to 90° C. and maintained thereat for 40 hours after which period of time substantial homopolymerization of propylene oxide occurred. The test tube was subsequently cooled to room temperature, and 5 grams of styrene oxide was charged to said test tube. The temperature of the resulting mixture was raised to 90° C. and maintained thereat for 104 hours after which period of time substantial homopolymerization of styrene oxide occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 8 grams of a white, resinous product which was insoluble in water, pentane, and hexane, and soluble in toluene and xylene. The block copolymer product possessed a reduced viscosity of 0.28 in benzene.

*Example 21*

To a 50 milliliter Pyrex test tube there were charged 5 grams of propylene oxide, 10 grams of toluene, and 1.0 gram of butylzinc butoxide. The resulting mixture was then heated to 90° C. and maintained thereat for 102 hours after which period of time substantial homopolymerization of propylene oxide occurred. The test tube was subsequently cooled to room temperature, and 5 grams of styrene oxide was charged to said test tube. The temperature of the resulting mixture was raised to 90° C. and maintained thereat for 42 hours after which period of time substantial homopolymerization of styrene oxide occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 9 grams of a white, resinous product which was insoluble in water, pentane, and hexane, and soluble in toluene and xylene. The block copolymer product possessed a reduced viscosity of 2.7 in benzene.

*Example 22*

To a 50 milliliter Pyrex test tube there were charged 5 grams of butylene oxide, 10 grams of toluene, and 1.0 gram of butylzinc butoxide. The resulting mixture was then heated to 90° C. and maintained thereat for 102 hours after which period of time substantial homopolymerization of butylene oxide occurred. The test tube was subsequently cooled to room temperature, and 5 grams of styrene oxide was charged to said test tube. The temperature of the resulting mixture was raised to 90° C. and maintained thereat for 42 hours after which period of time substantial homopolymerization of styrene oxide occurred as a polymer block of the block copolymer product. Addition of heptane to the reaction mixture, with agitation, resulted in the precipitation of the block copolymer product. This product was recovered by filtration and dried under reduced pressure at about 40° C. There was obtained 9 grams of a white, resinous product which was insoluble in water, pentane, and hexane, and soluble in toluene and xylene. The block copolymer product possessed a reduced viscosity of 1.21.

*Example 23*

To a 50 milliliter Pyrex test tube there is charged 9 grams of 6-oxabicyclo[3.1.0]hexane, 10 grams of toluene, and 0.3 gram of ethylmagnesium chloride, under a nitrogen atmosphere. The resulting mixture is then heated to approximately 100° C. and is maintained thereat until homopolymerization of 6-oxabicyclo[3.1.0]hexane is essentially quantitative. The test tube is subsequently cooled to about 25° C., and 3 grams of ethylene oxide is charged thereto. The temperature of the resulting mixture again is raised to about 100° C. and is maintained thereat until ethylene oxide is essentially homopolymerized as a polymer block of the block copolymer product. Addition of heptane to the cooled reaction mixture, with agitation, results in the precipitation of the block copolymer product. This product is recovered by filtration and is dried under reduced pressure at about 40° C. The conversion of monomeric reagents to polymer is essentially quantitative. There is obtained a white, resinous block copolymer product which is insoluble in water, pentane, and hexane, and soluble in benzene, toluene, and xylene.

To a 50 milliliter Pyrex test tube there is charged 10 grams of 2,3-epoxypentane, 10 grams of toluene, and 0.3 gram of ethylberyllium chloride, under a nitrogen atmosphere. The resulting mixture is then heated to approximately 100° C. and is maintained thereat until homopolymerization of 2,3-epoxypentane is essentially quantitative. The test tube is subsequently cooled to about 25° C., and 4 grams of propylene oxide is charged thereto. The temperature of the resulting mixture again is raised to about 100° C. and is maintained thereat until propylene oxide is essentially homopolymerized as a polymer block of the block copolymer product. Addition of heptane to the cooled reaction mixture, with agitation, results in the precipitation of the block copolymer product. This product is recovered by filtration and is dried under reduced pressure at about 40° C. The conversion of monomeric reagents to polymer is essentially quantitative. There is obtained a white, resinous block copolymer product which is insoluble in water, pentane, and hexane, and soluble in benzene, toluene, and xylene.

*Example 25*

To a 50 milliliter Pyrex test tube there is charged 12 grams of 2,3-epoxyoctane, 10 grams of toluene, and 0.3 gram of trimethylindium, under a nitrogen atmosphere. The resulting mixture is then heated to approximately 100° C. and is maintained thereat until homopolymerization of 2,3-epoxyoctane is essentially quantitative. The test tube is subsequently cooled to about 25° C. and 3 grams of 7-oxabicyclo[4.1.0]heptane is charged thereto. The temperature of the resulting mixture again is raised to about 100° C. and is maintained thereat until 7-oxabicyclo[4.1.0]heptane is essentially homopolymerized as a polymer block of the block copolymer product. Addition of heptane to the cooled reaction mixture, with agitation, results in the precipitation of the block copolymer product. This product is recovered by filtration and is dried under reduced pressure at about 40° C. The conversion of monomeric reagents to polymer is essentially quantitative. There is obtained a white, resinous block copolymer product which is insoluble in water, pentane, and hexane, and soluble in benzene, toluene, and xylene.

*Example 26*

To a 50 milliliter Pyrex test tube there is charged 10 grams of styrene oxide, 10 grams of toluene, and 0.3 gram of methylgallium dichloride, under a nitrogen atmosphere. The resulting mixture is then heated to approximately 100° C. and is maintained thereat until homopolymerization of styrene oxide is essentially quantitative. The test tube is subsequently cooled to about 25° C. and 5 grams of butylene oxides is charged thereto. The temperature of the resulting mixture again is raised to about 100° C. and is maintained thereat until butylene oxides is essentially homopolymerized as a polymer block of the block copolymer product. Addition of heptane to the cooled reaction mixture, with agitation, results in the precipitation of the block copolymer product. This product is recovered by filtration and is dried under reduced pressure at about 40° C. The conversion of monomeric reagents to polymer is essentially quantitative. There is obtained a white, resinous block copolymer product which is insoluble in water, pentane, and hexane, and soluble in benzene, toluene, and xylene.

*Example 27*

To a 50 milliliter Pyrex test tube there is charged 10 grams of propylene oxide, 10 grams of toluene, and 0.3 gram of dipropylcadmium, under a nitrogen atmosphere. The resulting mixture is then heated to approximately 100° C. and is maintained thereat until homopolymerization of propylene oxide is essentially quantitative. The test tube is subsequently cooled to about 25° C. and 5 grams of 1,2-epoxyhexane is charged thereto. The temperature of the resulting mixture again is raised to about 100° C. and is maintained thereat until 1,2-epoxyhexane is essentially homopolymerized as a polymer block of the block copolymer product. Addition of heptane to the cooled reaction mixture, with agitation, results in the precipitation of the block copolymer product. This product is recovered by filtration and is dried under reduced pressure at about 40° C. The conversion of monomeric reagents to polymer is essentially quantitative. There is obtained a white, resinous block copolymer product which is insoluble in water, pentane, and hexane, and soluble in benzene, toluene, and xylene.

*Example 28*

To a 50 milliliter Pyrex test tube there is charged 10 grams of diisobutylene oxide isomers, 10 grams of toluene, and 0.3 gram of triphenylaluminum, under a nitrogen atmosphere. The resulting mixture is then heated to approximately 100° C. and is maintained thereat until homopolymerization of diisobutylene oxide isomers is essentially quantitative. The test tube is subsequently cooled to about 25° C. and 3 grams of ethylene oxide is charged thereto. The temperature of the resulting mixture is raised to about 100° C. and is maintained thereat until ethylene oxide is essentially homopolymerized as a polymer block of the block copolymer product. Addition of heptane to the cooled reaction mixture, with agitation, results in the precipitation of the block copolymer product. This product is recovered by filtration and is dried under reduced pressure at about 40° C. The conversion of monomeric reagents to polymer is essentially quantitative. There is obtained a white, resinous block copolymer product which is insoluble in water, pentane, and hexane, and soluble in benzene, toluene, and xylene.

*Example 29*

To a 50 milliliter Pyrex test tube there is charged 12 grams of propylene oxide, 10 grams of toluene, and 0.3 gram of di-o-tolylzinc, under a nitrogen atmosphere. The resulting mixture is then heated to approximately 100° C. and is maintained thereat until homopolymerization of propylene oxide is essentially quantitative. The test tube is subsequently cooled to about 25° C. and 4 grams of glycidyl benzene is charged thereto. The temperature of the resulting mixture again is raised to about 100° C. and is maintained thereat until glycidyl benzene is essentially homopolymerized as a polymer block of the block copolymer product. Addition of heptane to the cooled reaction mixture, with agitation, results in the precipitation of the block copolymer product. This product is recovered by filtration and is dried under reduced pressure at about 40° C. The conversion of monomeric reagents to polymer is essentially quantitative. There is obtained a white, resinous block copolymer product which is insoluble in water, pentane, and hexane, and soluble in benzene, toluene, and xylene.

Although the invention has been illustrated by the preceding examples, the invention is not to be constructed as limited to the materials employed in the above exemplary examples, but rather, the invention encompasses the generic concept as hereinbefore disclosed. Various modifications and embodiments of this invention can be made without departing from the spirit and scope thereof.

What is claimed is:

1. A block copolymer having the formula:

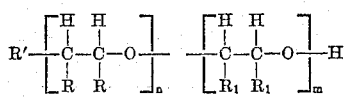

wherein each R and $R_1$, individually, is selected from the group consisting of hydrogen and a hydrocarbon radical free from ethylenic and acetylenic unsaturation except that at least one $R_1$ variable is always a hydrocarbon radical, and when both R variables are alkylene radicals there is formed with the vicinal carbon atoms of the bracketed oxyethylene group a saturated cycloaliphatic hydrocarbon nucleus containing from 4 to 10 carbon atoms; wherein R' is selected from the group consisting of alkoxy, aryloxy, and a hydrocarbon radical free from ethylenic and acetylenic unsaturation; wherein $n$ and $m$ are numbers, the ratio of $n/m$ being a value in the range of from about 0.05 to about 20; and wherein said block copolymer has a molecular weight of at least about 25,000.

2. A resinous block copolymer which comprises a homopolymerized block of a 1,2-alkylene oxide linearly united to a homopolymerized block of a dissimilar 1,2-alkylene oxide, said block copolymer having a molecular weight of at least about 25,000.

3. A block copolymer having the formula:

$$R'(\text{oxyalkylene A})_n(\text{oxyalkylene B})_m H$$

wherein oxyalkylene A and oxyalkylene B represent dissimilar oxyalkylenes formed by the ring opening of the epoxy group of the corresponding 1,2-alkylene oxide; wherein R' is selected from the group consisting of an alkoxy, aryloxy, and a hydrocarbon radical free from ethylenic and acetylenic unsaturation; wherein $n$ and $m$ are numbers, the ratio of $n/m$ being a value in the range of from about 0.05 to about 20; and wherein said block copolymer has a molecular weight of at least about 25,000.

4. A block copolymer having the formula:

$$R'(\text{oxyethylene})_n(\text{oxypropylene})_m H$$

wherein R' is selected from the group consisting of an alkoxy, aryloxy, and a hydrocarbon radical free from ethylenic and acetylenic unsaturation; wherein $n$ and $m$ are numbers, the ratio of $n/m$ being a value in the range of 0.05 to 20; and wherein said block copolymer has a molecular weight of at least about 25,000.

5. A block copolymer having the formula:

$$R'(\text{oxyethylene})_n(\text{oxybutylene})_m H$$

wherein R' is selected from the group consisting of an alkoxy, aryloxy, and a hydrocarbon radical free from ethylenic and acetylenic unsaturation; wherein $n$ and $m$ are numbers, the ratio of $n/m$ being a value in the range of 0.05 to 20; and wherein said block copolymer has a molecular weight of at least about 25,000.

6. A block copolymer having the formula:

$$R'(\text{oxyethylene})_n(\text{oxystyrene})_m H$$

wherein R' is selected from the group consisting of an alkoxy, aryloxy, and a hydrocarbon radical free from ethylenic and acetylenic unsaturation; wherein $n$ and $m$ are numbers, the ratio of $n/m$ being a value in the range of 0.05 to 20; and wherein said block copolymer has a molecular weight of at least about 25,000.

7. A block copolymer having the formula:

$$R'(\text{oxypropylene})_n(\text{oxybutylene})_m H$$

wherein R' is selected from the group consisting of an alkoxy, aryloxy, and a hydrocarbon radical free from ethylenic and acetylenic unsaturation; wherein $n$ and $m$ are numbers, the ratio of $n/m$ being a value in the range of 0.05 to 20; and wherein said block copolymer has a molecular weight of at least about 25,000.

8. A process for preparing block copolymers which comprises contacting a first 1,2-alkylene oxide with a catalytic quantity of an organometallic compound having the formula:

$$R'MR_a''$$

wherein R' is selected from the group consisting of an alkoxy, aryloxy, and a hydrocarbon radical free from ethylenic and acetylenic unsaturation; wherein M is selected from the group consisting of the metals represented by group II and group III of the periodic table; wherein R" is selected from the group consisting of halogen, aryloxy, alkoxy, and a hydrocarbon radical free from ethylenic and acetylenic unsaturation; wherein $a$ is an integer greater than zero and less than 3 and depends for its value on the valence of M; under an inert atmosphere; for a period of time sufficient to effect homopolymerization of said first 1,2-alkylene oxide; subsequently introducing a second 1,2-alkylene oxide to the reaction mixture maintained under an inert atmosphere; continuing the polymerization reaction for a period of time sufficient to homopolymerize said second 1,2-alkylene oxide as a homopolymer block linearly attached to said first homopolymerized 1,2-alkylene oxide; and recovering the resulting block copolymer product.

9. The process of claim 8 wherein the concentration of said organometal compound is in the range of from about 0.01 to about 15 weight percent, based on the weight of monomeric 1,2-alkylene oxide.

10. A process for preparing block copolymers which comprises contacting a first 1,2-alkylene oxide having the formula:

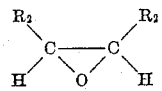

wherein each $R_2$, individually, is selected from the group consisting of hydrogen and a hydrocarbon radical free from ethylenic and acetylenic unsaturation except that when both $R_2$ variables are alkylene radicals there is formed with the epoxy carbon atoms a saturated cycloaliphatic hydrocarbon nucleus containing from 4 to 10 carbon atoms; with from about 0.01 to about 15 weight percent, based on the weight of the above-said 1,2-alkylene oxide of the formula:

$$R'MR_a''$$

wherein R' is selected from the group consisting of an alkoxy, aryloxy, and a hydrocarbon radical free from ethylenic and acetylenic unsaturation; wherein M is selected from the group consisting of the metals represented by group II and group III of the periodic table wherein R" is selected from the group consisting of halogen, aryloxy, alkoxy, and a hydrocarbon radical free from ethylenic and acetylenic unsaturation; wherein $a$ is an integer greater than zero and less than 3 and depends for its value on the valence of M; under an inert atmosphere; at a temperature in the range of from about 20° C. to about 150° C.; for a period of time sufficient to effect substantial homopolymerization of said first 1,2-alkylene oxide as a homopolymer block linearly attached to said first homopolymerized 1,2-alkylene oxide; and recovering the resulting block copolymer product.

11. The process of claim 10 wherein the polymerization reaction temperature is in the range of from about 75° C. to about 110° C.

12. The process of claim 11 wherein said organometallic compound is a group II metal dialkyl.

13. The process of claim 11 wherein said organometallic compound is a group III metal trialkyl.

14. The process of claim 12 wherein said first 1,2-alkylene oxide is ethylene oxide and said second 1,2-alkylene oxide is propylene oxide.

15. The process of claim 12 wherein said first 1,2-alkylene oxide is ethylene oxide and said second 1,2-alkylene oxide is butylene oxide.

16. The process of claim 12 wherein said first 1,2-alkylene oxide is ethylene oxide and said second 1,2-alkylene oxide is styrene oxide.

17. The process of claim 14 wherein said group II metal dialkyl is dibutylzinc.

References Cited in the file of this patent

UNITED STATES PATENTS

| | | |
|---|---|---|
| 2,293,868 | Toussaint | Aug. 25, 1942 |
| 2,510,540 | Ballard et al. | June 6, 1950 |
| 2,674,619 | Lundsted | Apr. 6, 1954 |
| 2,923,690 | Bedoit | Feb. 2, 1960 |

OTHER REFERENCES

Valentine: "Recent Developments in Copolymers," Fibres (Natural and Synthetic), February 1955, page 61.